US005924669A

United States Patent [19]

Richins

[11] Patent Number: 5,924,669

[45] Date of Patent: Jul. 20, 1999

[54] COLLAPSIBLE FRAME FOR LIGHT MODIFYING FLAG

[75] Inventor: Russell D. Richins, Orem, Utah

[73] Assignee: Russell Richins, Orem, Utah

[21] Appl. No.: 08/832,242

[22] Filed: Apr. 3, 1997

[51] Int. Cl.[6] ............................ F16M 13/00; G09F 17/00

[52] U.S. Cl. .......................... 248/513; 248/200; 135/127; 116/174

[58] Field of Search ................................ 248/200, 205.2, 248/353, 534, 513, 354.3, 122.1, 121; 135/98, 123, 127; 116/173, 174

[56] References Cited

U.S. PATENT DOCUMENTS

| | | | |
|---|---|---|---|
| 2,948,287 | 8/1960 | Rupert | 135/126 |
| 3,693,641 | 9/1972 | Moss | 135/127 |
| 4,077,417 | 3/1978 | Beavers | 135/121 |
| 4,408,955 | 10/1983 | Wagle et al. | 416/119 |
| 4,544,120 | 10/1985 | Lowell et al. | 248/122 |
| 4,865,287 | 9/1989 | Stoudt | 248/513 |
| 4,933,019 | 6/1990 | Peruski | 135/123 |
| 4,971,090 | 11/1990 | Uhl | 135/98 |
| 5,255,627 | 10/1993 | Williams | 116/174 |
| 5,370,145 | 12/1994 | Wu | 135/127 |
| 5,423,341 | 6/1995 | Brady | 135/139 |

*Primary Examiner*—Ramon O. Ramirez
*Assistant Examiner*—Anita M. King
*Attorney, Agent, or Firm*—Trask, Britt & Rossa

[57] ABSTRACT

A collapsible frame for a light modifying flag frame comprising a plurality of rods detachably attached to a hub and extending substantially radially therefrom. The rods of the flag frame detachably attached to the hub such that the flag frame can be quickly set up and broken-down for ease of transport.

23 Claims, 15 Drawing Sheets

COLLAPSIBLE FRAME FOR LIGHT MODIFYING FLAG

BACKGROUND OF THE INVENTION

1. Field of the Invention

The present invention relates to light modification equipment for photography. More particularly, the present invention relates to a supporting structure for a light modifying flag.

2. State of the Art

It is known in still photography and motion picture photography that certain lighting effects can be achieved through the use of flags. These flags are used to block light with opaque materials, to reflect light with reflecting materials, and/or to alter light with colored, translucent, or semi-translucent materials though which light is transmitted or reflected.

These flags are generally rigidly held or supported by frames. These frames are generally attached to a support structure, such as a tripod, in order to retain the flag in a fixed orientation with light sources and/or cameras.

An exemplary flag/frame/support configuration is taught in U.S. Pat. No. 4,544,120 issued Oct. 1, 1985 to Lowell, et al. ("the Lowell patent"). FIG. 22 illustrates an oblique view of the flag/frame/support configuration of the Lowell patent. A frame 300 is shown connected to a tripod 304 of known design by a clamp 306. A flag 302 is attached to flag supporting rods 310, 312 which are pivotally connected to a main rod 308 by first and second hinges 314, 316, respectively. Each flag supporting rod 310, 312 includes at least one clip 318. Each clip 318 resiliently holds the flag 302, such that the flag 302 is stretched and held between the flag supporting rods 310, 312. A third hinge 320 is connected at an intermediate location on the main rod 308, and pivotally receives a frame support rod 322. The frame support rod 322 is attached to the tripod 304 by the clamp 306.

The disadvantage of the flag frame of the Lowell patent is that it relies on a complex hinging arrangement which can suffer from mechanical failure. Furthermore, flag frames of the type disclosed in the Lowell patent require considerable time to set up and configure.

Therefore, it would be advantageous to develop a flag frame which is simple to set up and configure and which has minimal mechanical parts.

SUMMARY OF THE INVENTION

For purposes of this invention, the term "photography" is defined to encompass recording of images, moving or still, with single-frame photographic cameras, single-frame digital cameras, multiple-frame movie and videotape cameras, and the like. Likewise, the term "flag" is defined to encompass any flexible material, such as fabric, plastic films or "gels" (e.g., Mylar™), paper, or the like. This material can be of any color or opacity, such a black opaque cloth for blocking light, a white opaque cloth or reflective material (mirror or metal-like) for reflecting light, or colored, translucent or semi-translucent cloth or plastic material for diffusing, coloring, softening, or otherwise modifying light directed through or reflected off the material.

The present invention is a collapsible flag frame which can be quickly and conveniently broken-down for ease of transport. One embodiment of the collapsible flag frame of the present invention comprises four rods which extend radially from a central hub. The central hub may also include a means for attaching the flag to a support structure, such as an attachment rod for securing the collapsible flag frame to a tripod or similar supporting mechanism. The four rods consist of two upper rods of substantially equal length and two lower rods of substantially equal length which are shorter that the upper rods. The attachment rod extends from the central hub between the lower rods. The upper and lower rods are preferably made from resiliently deformable material such as metal, plastic, fiberglass, or the like. Each of the upper and lower rods may be a single rod or detachably attached multiple rod pieces. Separating the rods into multiple rod pieces conserves space when the collapsible flag frame is broken-down.

The upper and lower rods may be detachably attached to the central hub and detachably attached between multiple rod pieces by a various means including, but not limited to: slip fits, spring retainers, cooperating male and female threads, and elastic material extending between the rods or the rod and central hub. One embodiment utilizing this four-rod frame comprises rods made of hollow aluminum tubes with slip fits and two elastic cords, each extending through a pair of rods. For example, an end of an elastic cord is attached to a distal end of an upper rod. The first elastic cord extends through the upper rod, through the central hub, and through another rod, whether upper or lower, to attach to an end of that rod. The second elastic cord extends in a like manner through the two remaining rods.

A flag is detachably attached to the four-rod frame. The flag includes means for attachment to the upper and lower rods, such as flaps sewn, glued, heat bonded, or otherwise attached, to four corners of the flag. End portions of the upper rods and lower rods are inserted into the flaps to hold the flag in place. Preferably, the flag is slightly smaller than the shape formed by the upper and lower rods such that at least one rod will have to be deformed to fit into its respective flap. This creates tension to hold the flag taut on the flag frame.

Another embodiment of the collapsible flag frame of the present invention comprises two L-shaped rods which extend substantially radially from a central hub. The central hub also includes an attachment rod for attachment to a tripod. The two L-shaped rods each consist of a horizontal rod portion extending from the central hub substantially perpendicular to the attachment rod and a vertical rod portion attached to the horizontal rod portion and extending in a substantially opposing direction to the attachment rod. The L-shaped rods are preferably made from resiliently deformable material such metal, plastic, fiberglass, or the like. Each of the L-shaped rods may be a single rod or detachably attached multiple rod pieces. Separating the rods into multiple rod pieces conserves space when the collapsible flag frame is broken-down.

The L-shaped rods may be detachably attached to the central hub and detachably attached between multiple rod pieces by a various means including, but not limited to: slip fits, spring retainers, cooperating male and female threads, and elastic material extending between the rods or the rod and central hub. One embodiment utilizing this two-rod frame comprises rods made of hollow aluminum tubes with slip fits and an elastic cord extending through the L-shaped rods. For example, an end of an elastic cord is attached to a distal end of one vertical rod portion of one L-shaped rod and extends through the one L-shaped rod, through the central hub, and through the other L-shaped rod to attach to an end of the vertical rod portion of the other L-shaped rod.

A flag is detachably attached to the two-rod frame. The flag includes rod attachment means, such as sleeves and/or loops. The vertical rod portions are inserted into the flag sleeves or vertical loops, and horizontal loops encircle the horizontal rod portions to hold the flag on the frame. The loops may be a wide variety of structures and materials, such as Velcro™ material, material with a snap attachment, tie strings, and the like.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE PREFERRED EMBODIMENTS

Figure 1:
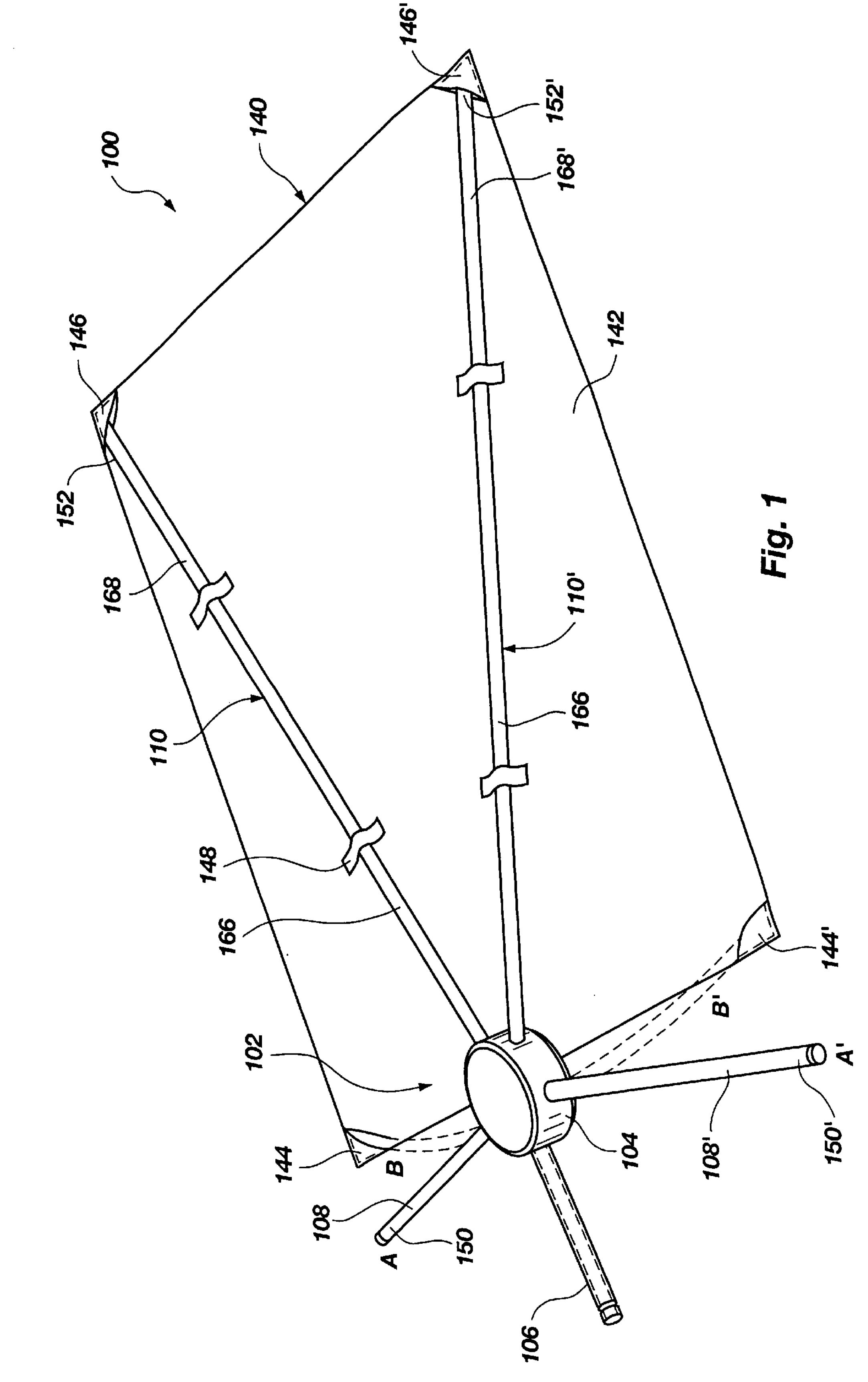
FIG. 1 illustrates an oblique view of an embodiment of a flag frame assembly of the present invention.

FIG. 1 illustrates an embodiment of a four-rod flag frame assembly 100 of the present invention. The flag frame assembly 100 includes a four-rod frame 102 comprising a central hub 104 with an attachment rod 106 extending therefrom, and four rods, two lower rods 108, 108' of substantially equal length extending from the central hub 104, and two upper rods 110, 110' of substantially equal length also extending from the central hub 104. The lower rods 108, 108' and the upper rods 110, 110' are preferably oriented in substantially the same plane. The lower rods 108, 108' and the upper rods 110, 110' are preferably made from deformable, resilient material such metal, plastic, fiberglass, or the like. Most preferably the lower rods 108, 108' and the upper rods 110, 110' are hollow aluminum tubes, such as 0.340 or 0.380 inch outside diameter tent tubes made by Easton Aluminum of Salt Lake City, Utah. The hollow aluminum tubes may be black anodized to prevent glare.

Figure 2:
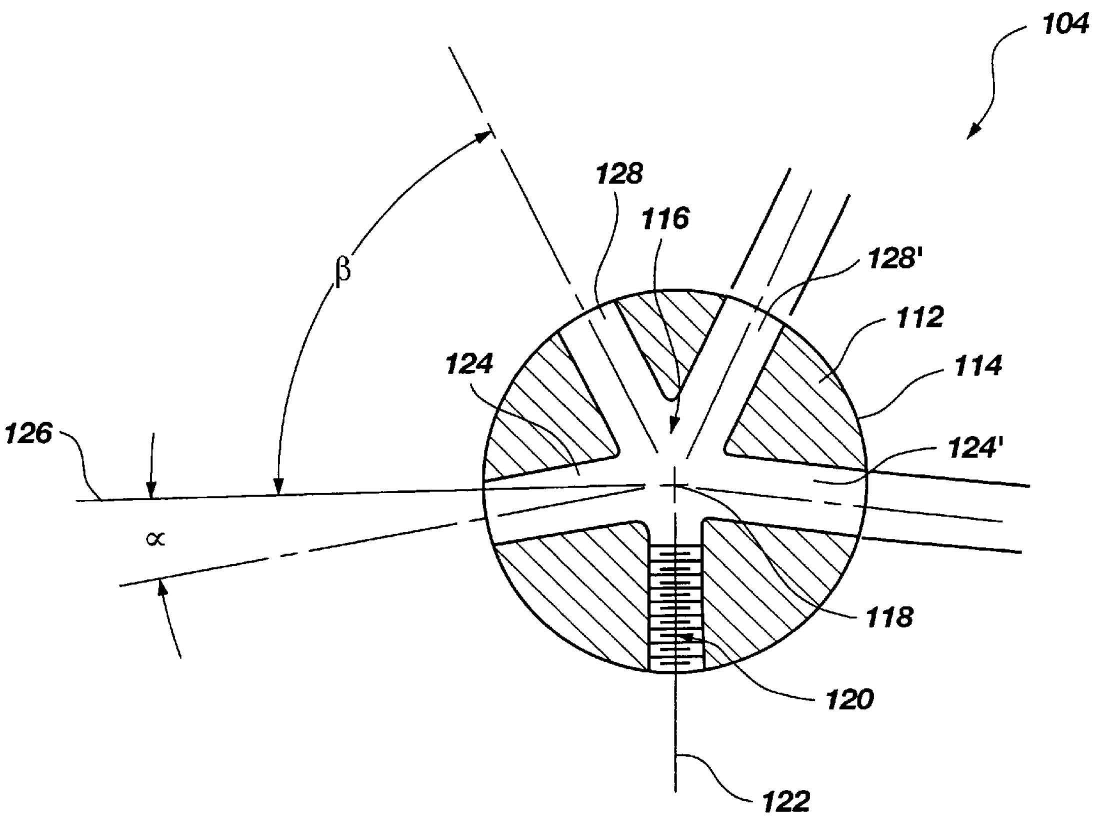
FIG. 2 illustrates a cross-sectional view of an embodiment of a central hub of the flag frame of FIG. 1 of the present invention.

The central hub 104 is illustrated in FIG. 2. The central hub 104 is preferably a circular housing 112 including five bores each extending from an outer circumference 114 to a convergence area 116 proximate a center 118 of the circular housing 112. The central hub 104 is preferably made of a light-weight material, such as plastic, aluminum, aluminum alloys, or the like.

The five bores include a threaded bore 120 shown aligned on a vertical axis 122. The threaded bore 120 receives a threaded portion (not shown) of the attachment rod 106 (shown in FIG. 1). It is, of course, understood that the treaded bore 120 could be any configuration to receive and hold the attachment rod 106, or that threaded bore 120 could be eliminated by integrally forming the attachment rod 106 with the central hub 104 or by permanently attaching the attachment rod 106 to the central hub 104, such as by welding or an adhesive. The attachment rod 106 is used to attach the flag frame assembly 100 to a tripod or other flag frame support structure (not shown).

Two of the five bores are lower rod receiving bores 124, 124' for inserting lower rods 108, 108', respectively. The lower rod receiving bores 124, 124' are preferably angled slightly below a horizontal axis 126 of the central hub 104, shown as angle $\alpha$. In the illustrated embodiment of FIG. 2, the angle $\alpha$ is about 8 degrees below a horizontal axis 126.

The remaining two bores are upper rod receiving bores 128, 128' for inserting upper rods 110, 110', respectively. The upper rod receiving bores 128, 128' are positioned at angle $\beta$ above the horizontal axis 126. In the illustrated embodiment of FIG. 2, the angle $\beta$ is about 62 degrees above the horizontal axis 126.

Figure 3:
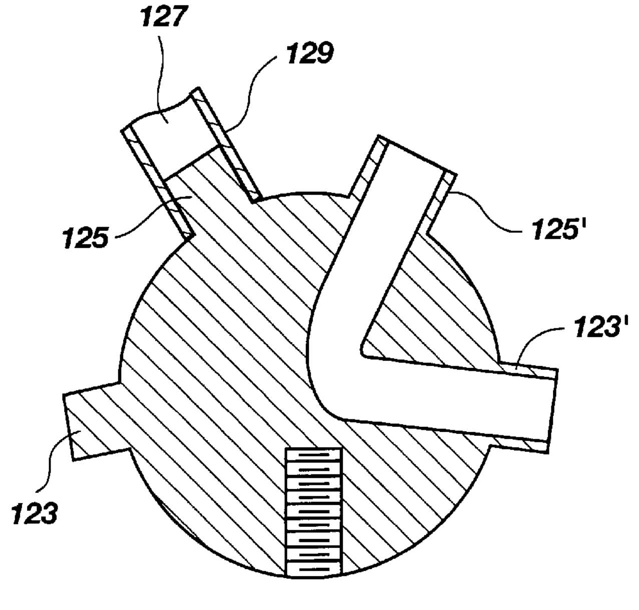
FIG. 3 illustrates a cross-sectional view of another embodiment of a central hub of the flag frame of FIG. 1 of the present invention.

In a preferred embodiment, the central hub is about 1.75 inches in diameter. The lower rod receiving bores 124, 124' and the upper rod receiving bores 128, 128' are preferably cylindrical and are preferably about 0.290 inches to about 0.325 inches in diameter 130 (depending on the diameter of the lower rods 108, 108' and the upper rods 110, 110'). It is, of course, understood that the central hub, the lower rod receiving bores, and the upper rod receiving bores can be of any shape or configuration depending on the size and shape of the flag to be attached to the frame. Referring to FIG. 3, it is also understood that the central hub 104 could have studs 123, 123', 125, and 125'. For example, a hollow portion 127 of a rod 129 could fit over a stud (shown over the stud 125). The studs 123, 123', 125, 125' may be solid, as shown in the studs 123 and 125, or may be hollow as shown 123' and 125'.

Referring to FIG. 1, a flag 140 is detachably attached to the four-rod frame 102. The flag 140 includes rod attachment means, such as lower flaps 144, 144' and upper flaps 146, 146'. End potions 152, 152' of the upper rods 110, 110' are inserted into the upper flaps 146, 146', respectively. End portions 150, 150' of the lower rods 108, 108' are inserted into the lower flaps 144, 144', respectively. As illustrated, the flag 140 is sized such that the lower rods 108, 108' must be deformed from position A, A' to position B, B' (shown in dashed lines), respectively. This creates tension on the flag 140 thereby holding it taut on the four-rod frame 102. The flag 140 optionally has tabs 148 which hold flag 140 against the upper rods 110, 110'. Preferably, the tabs 148 are made of a VELCRO™ material or fabric with snaps for easy removal of the tabs 148 from around the upper rods 110, 110'. However, it is understood that tabs 148 may be a wide variety of structures, such as each tab 148 being permanently attached to the flag 140 through which the upper rods 110 and 110' are inserted, or each tab 148 being two pieces of thin material, one attached to each side of the upper rods 110 and 110', wherein each of the corresponding two pieces are tied together over the upper rods 110, 110'.

Figure 4:
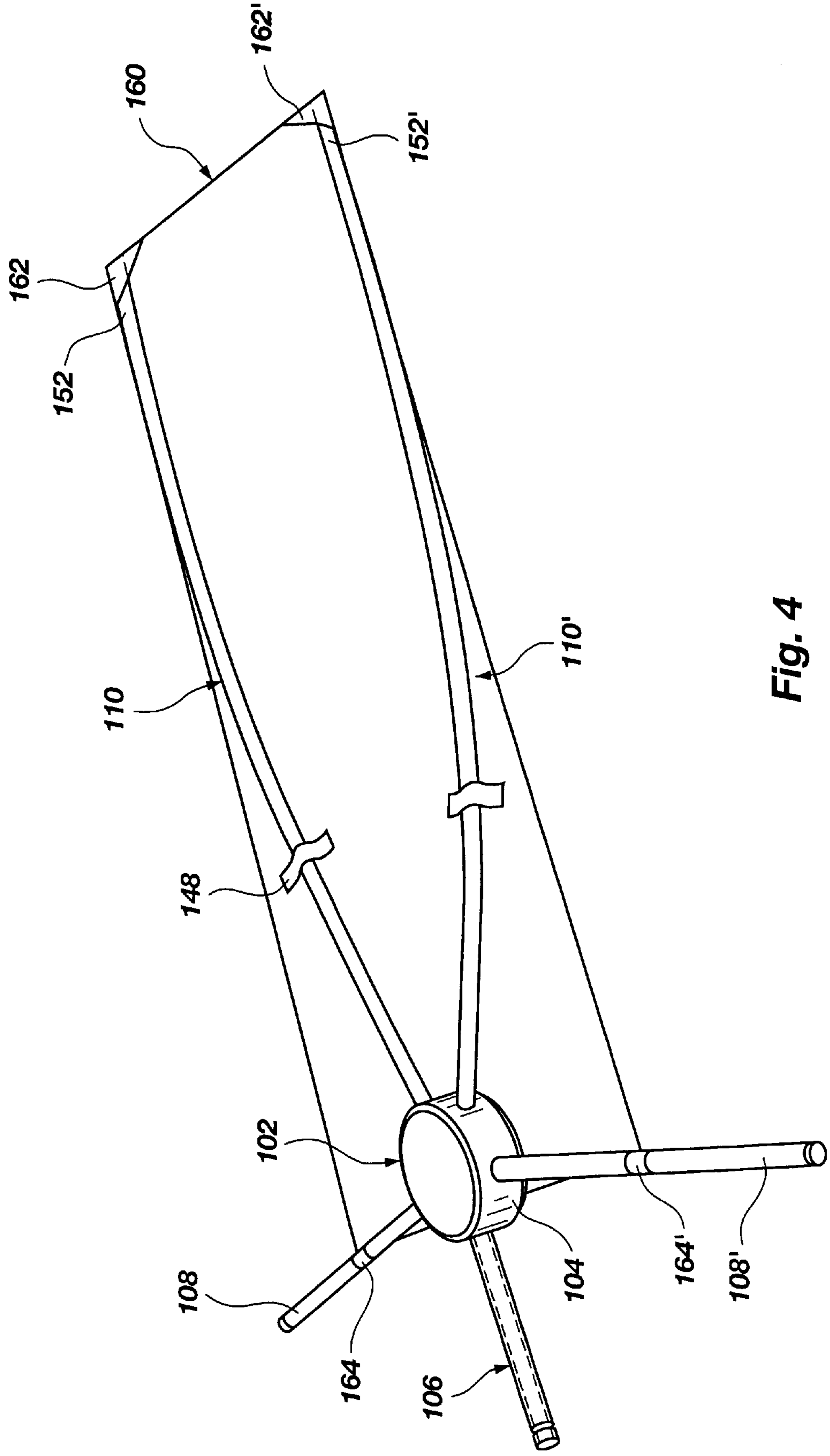
FIG. 4 illustrates an oblique view of a flag frame of FIG. 1 having an alternate flag.

FIG. 4 illustrates the four-rod frame 102 of FIG. 1 with a narrow alternate flag 160 detachably attached thereto. Elements common to FIG. 1 and FIG. 4 retain the same numeric designation. Since the upper rods 110, 110' are preferably made from deformable, resilient material, they may be deformed to accommodate a variety of flag sizes, such as the narrow alternate flag 160. The alternate flag 160 includes upper rod attachment means, such as flaps 162, 162' into which end potions 152, 152' of the upper rods 110, 110' are inserted. The alternate flag 160 also includes lower rod attachment means, such as loops 164, 164'. It is understood that the loops 164, 164' may be a wide variety of structures, such as a solid loop attached to the flag 160 through which the lower rods 108 and 108' are inserted, or each of the loops 164, 164' being two pieces of thin material, wherein each of the corresponding two pieces are tied together around the lower rods 108, 108'. Furthermore, the loops 164, 164' can be made of VELCRO™ material or have a snap attachment. It is, of course, understood that the lower rods 108 and 108' may be replaced with shorter rods to accommodate fitting in flaps, such as shown as lower flaps 144, 144' in FIG. 1.

Figure 5:
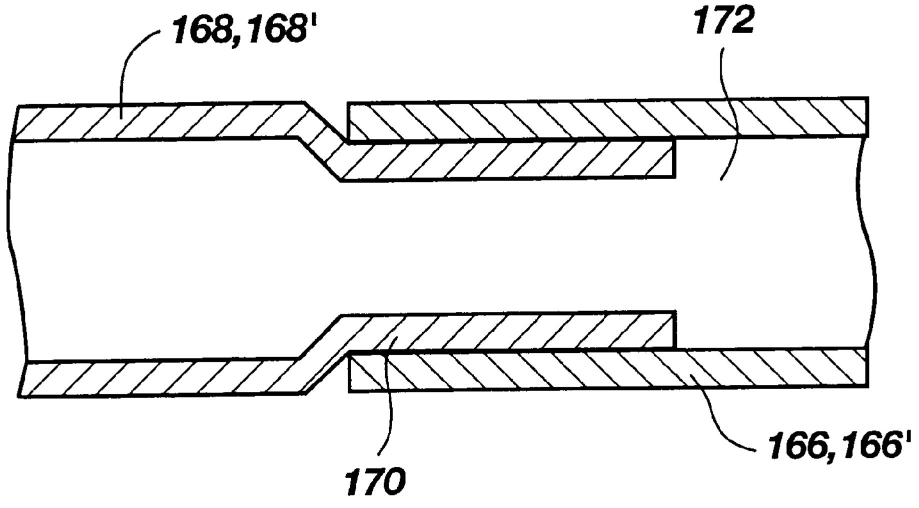
FIGS. 5 through 14 illustrate various attachment means for attaching separate rods together or rods to a central hub.
Figure 6:
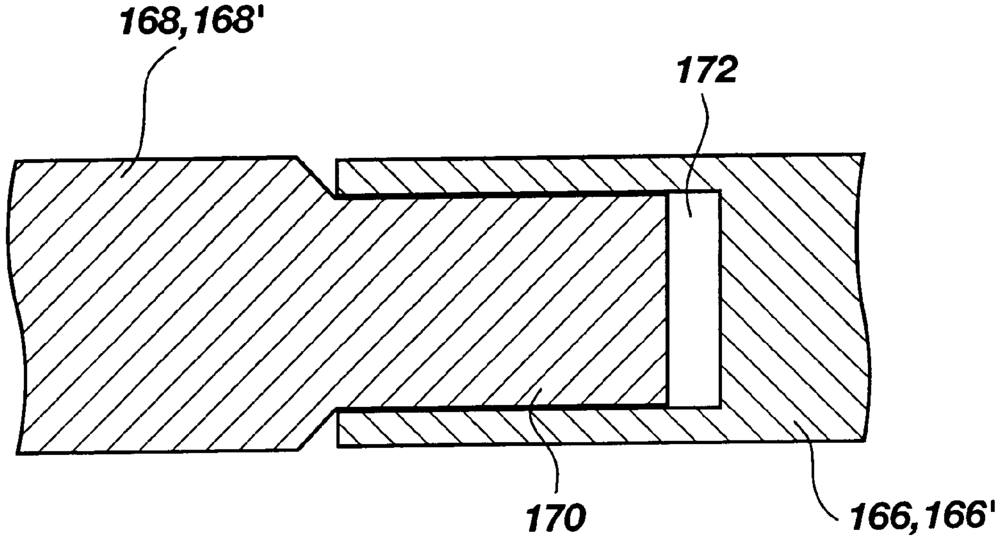

The upper rods 110, 110' are preferably constructed of two separate rods, first upper rods 166, 166' and second upper rods 168, 168', as shown in FIG. 1, wherein the first upper rods 166, 166' attach to the second upper rods 168, 168', respectively. Separating each of the upper rods 110, 110' into two separate rods conserves space when the four-rod frame 102 is collapsed. The first upper rods 166, 166' can be attached to the second upper rods 168, 168' by a variety of attachment means. FIGS. 5 and 6 illustrate a slip or friction fit wherein one of the first upper rods 166, 166' or the second upper rods 168, 168' (shown as second upper rod 168, 168') is necked down to form an insertion portion 170 approximately the inside diameter of a receiving portion 172 of the opposing rod (shown as first upper rod 166, 166'). The first upper rods 166, 166' and second upper rods 168, 168' may be hollow as shown in FIG. 5 or solid as shown in FIG. 6.

Figure 7:
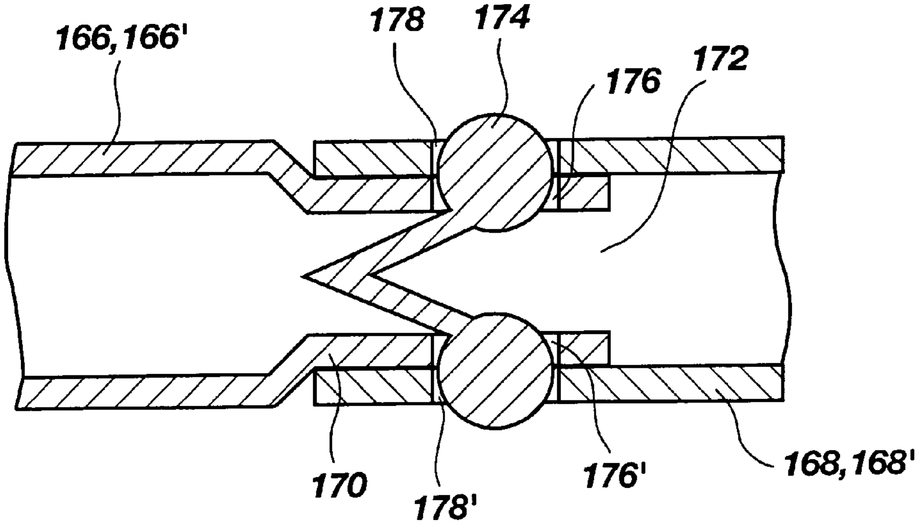
Figure 8:
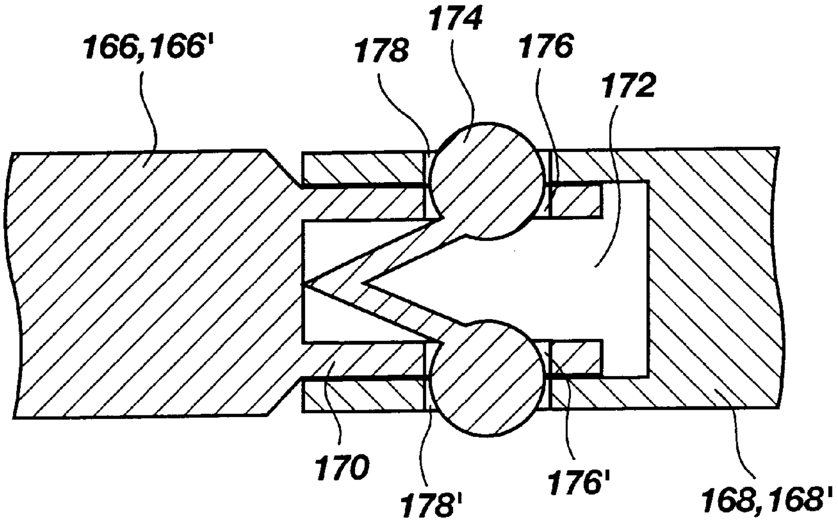

The first upper rods 166, 166' can be engaged to the second upper rods 168, 168', as shown in FIGS. 7 and 8 by a spring retainer 174 or the like. Elements common to FIGS. 5 and 6 and FIGS. 7 and 8 retain the same numeric designation. The second upper rod insertion portion 170 has a spring retainer 174 therein which is biased partially through bores 176, 176'. When the second upper rod insertion portion 170 is inserted into the first upper rod receiving portion 172, a portion of the spring retainer 174 extends into bores 178, 178' of the first upper rods 166, 166'. The first upper rods 166, 166' and second upper rods 168, 168' may be hollow as shown in FIG. 7 or solid as shown in FIG. 8.

Figure 9:
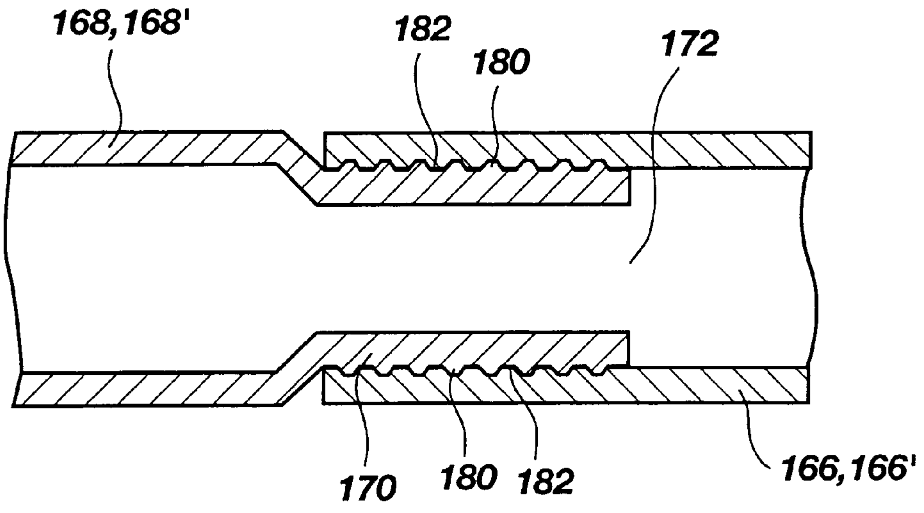
Figure 10:
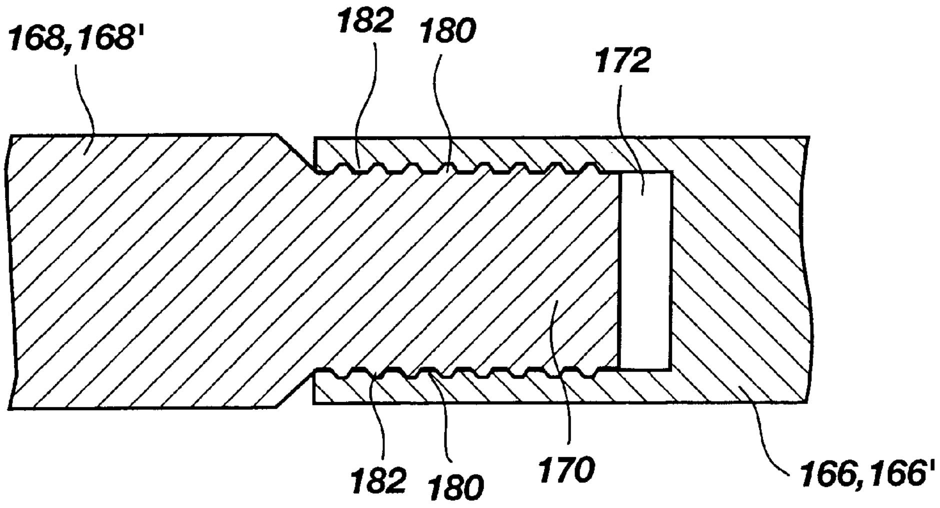

The first upper rods 166, 166' can be threadably engaged to the second upper rods 168, 168', as shown in FIGS. 9 and 10. Elements common to FIGS. 5 and 6 and FIGS. 9 and 10 retain the same numeric designation. The second upper rod insertion portion 170 has threads 180 which matingly engage threads 182 of the first upper rod receiving portion 172. The first upper rods 166, 166' and second upper rods 168, 168' may be hollow as shown in FIG. 9 or solid as shown in FIG. 10.

Figure 11:
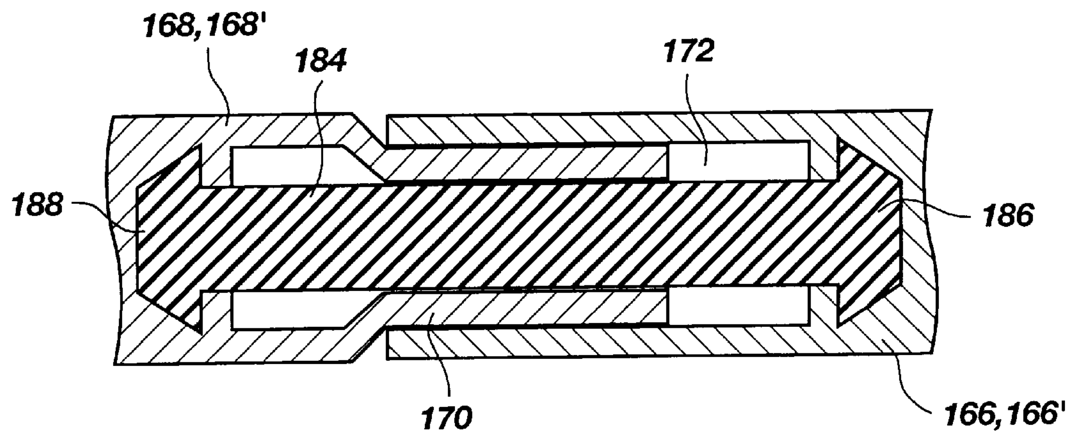
Figure 12:
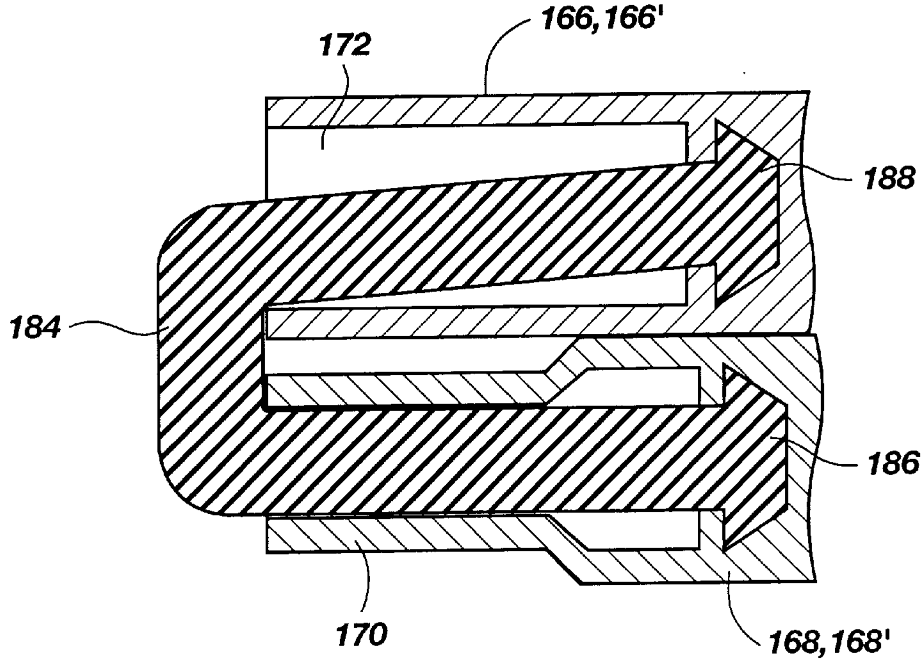

The first upper rods 166, 166' can be resiliently engaged to the second upper rods 168, 168' by an elastic material 184, as shown in FIGS. 11 and 12. Elements common to FIGS. 5 and 6 and FIGS. 11 and 12 retain the same numeric designation. A single piece of the-elastic material 184 is anchored by a first end 186 in the first upper rod 166, 166' and by a second end 188 in second upper rod 168, 168' wherein the elastic material 184 extends through the first upper rod receiving portion 172 and the second upper rod insertion portion 170. When the upper rod 110, 110' is collapsed, the first upper rod 166, 166' is held adjacent to the second upper rod 168, 168', as shown in FIG. 12.

Figure 13:
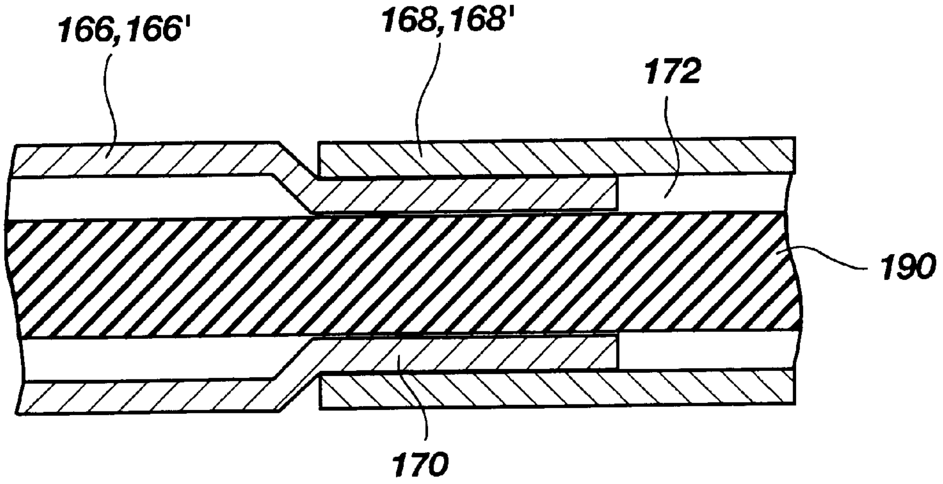
Figure 14:
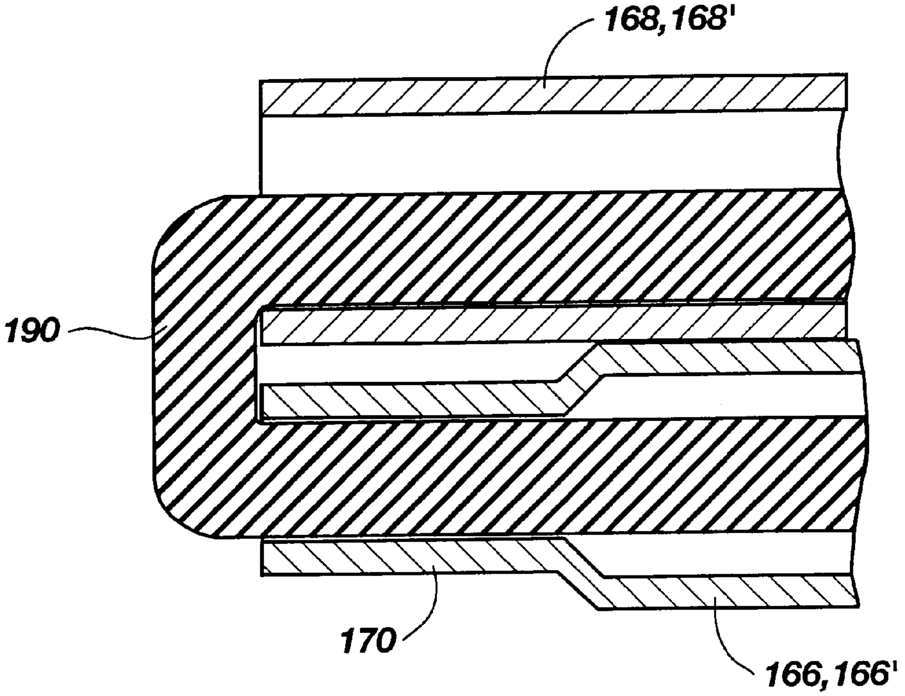

The first upper rods 166, 166' can be resiliently engaged to the second upper rods 168, 168' by an elastic material 190, as shown in FIGS. 13 and 14. Elements common to FIGS. 5 and 6 and FIGS. 13 and 14 retain the same numeric designation. A single piece of the elastic material 190 extends completely through the first upper rods 166, 166' and second upper rods 168, 168', and is anchored at an end (not shown) of the second upper rod 168, 168' and at an end (not shown) of the first upper rod 166, 166' or at another position of the four-rod frame 102. When the upper rod 110, 110' is collapsed, the first upper rod 166, 166' is held adjacent to the second upper rod 168, 168', as shown in FIG. 14.

It is, of course, understood that all of engagement means described in FIGS. 5 through 14 can be utilized for engaging the upper rods 110, 110' and the lower rods 108, 108' to the central hub 104.

Figure 15:
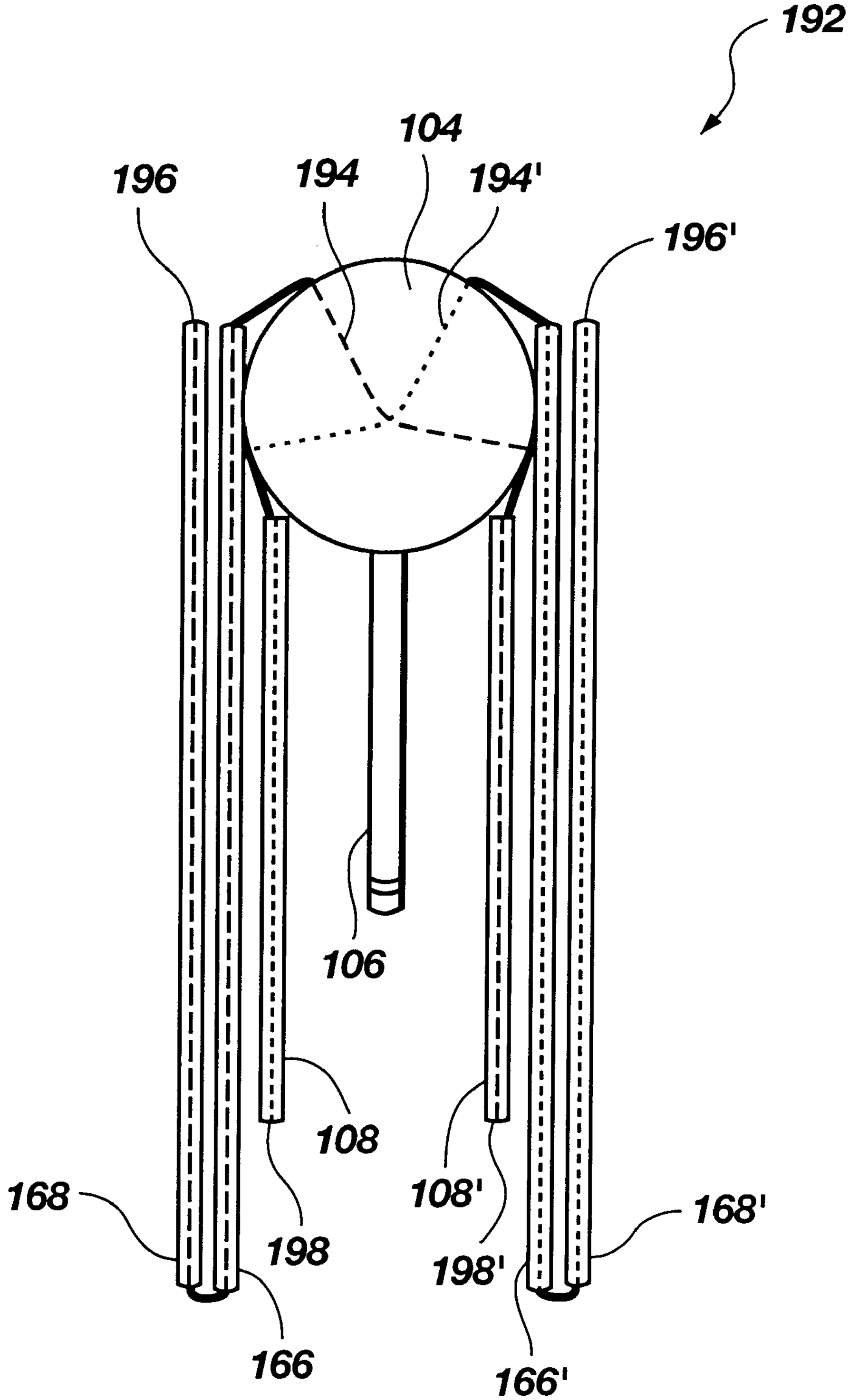
FIG. 15 illustrates an oblique view of an embodiment of a flag frame of FIG. 1 in a collapsed position.
Figure 16:
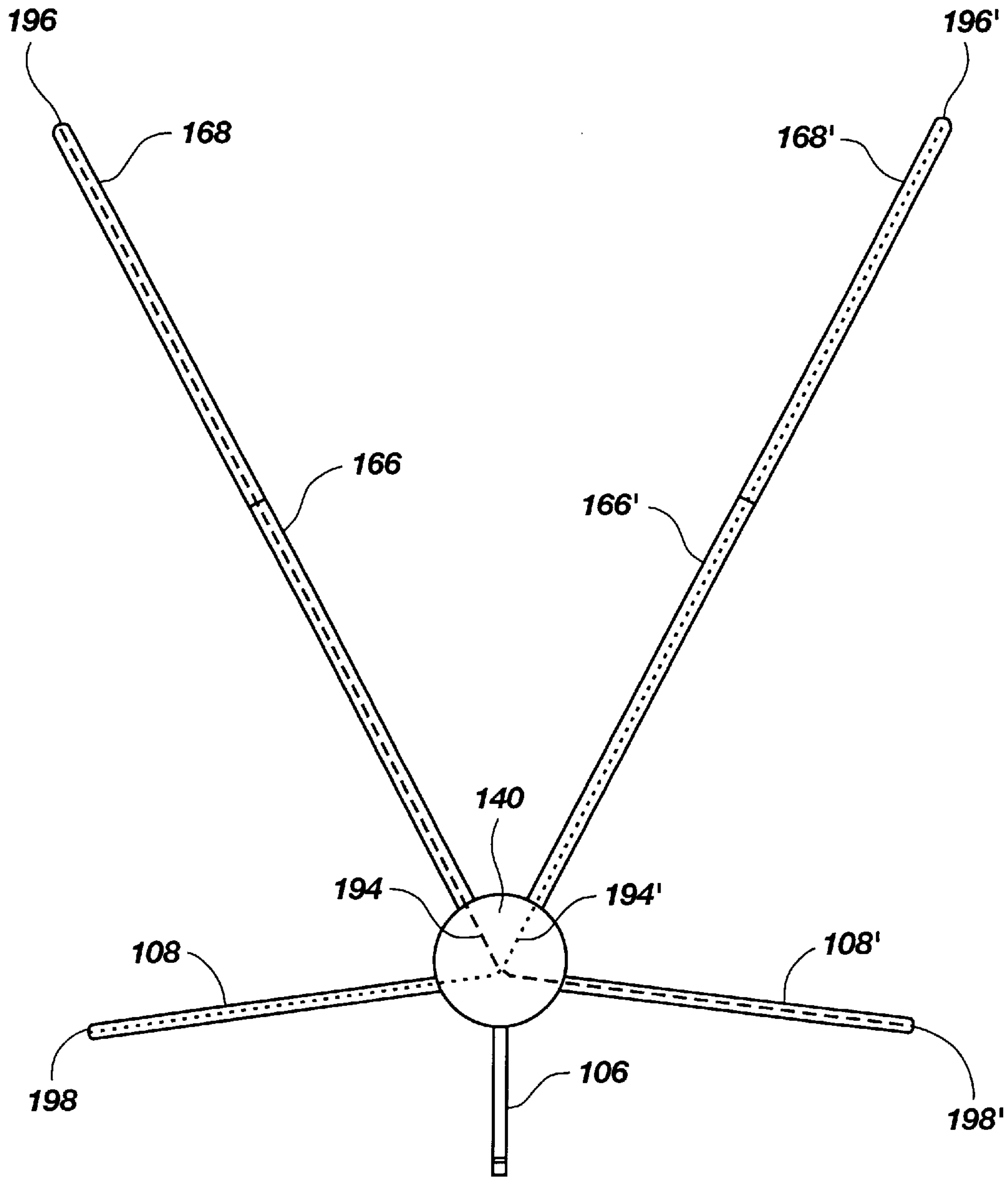
FIG. 16 illustrates an oblique view of an embodiment of a flag frame of FIG. 1 in an extended position.

FIG. 15 illustrates a four-rod frame 192 of the present invention in a collapsed position and utilizing the elastic material engaging means described in FIG. 14. FIG. 16 illustrates the four-rod frame 192 of FIG. 15 in an extended position. FIGS. 15 and 16 illustrate how elastic rods 194 (shown primarily as a dashed line) and 194' (shown primarily as a dotted line) are utilized to serve the dual purpose of attaching the first upper rods 166, 166' to the second upper rods 168, 168', respectively, and attach the lower rods 108, 108' and the upper rods 110, 110' to the central hub 104. The elastic rod 194 is attached proximate an end 196 of the second upper rod 168 and extends through the second upper rod 168, the first upper rod 166, the central hub 104, and the lower rod 108' where it is attached to an end 198' of the lower rod 108'. The elastic rod 194' is attached proximate an end 196' of the second upper rod 168' and extends through the second upper rod 168', the first upper rod 166', the central hub 104, and the lower rod 108 where it is attached to an end 198 of the lower rod 108. Preferably, the elastic rods 194, 194' are sufficiently taut when the four-rod frame 102 is in an extended position to maintain the frame's shape.

Figure 17:
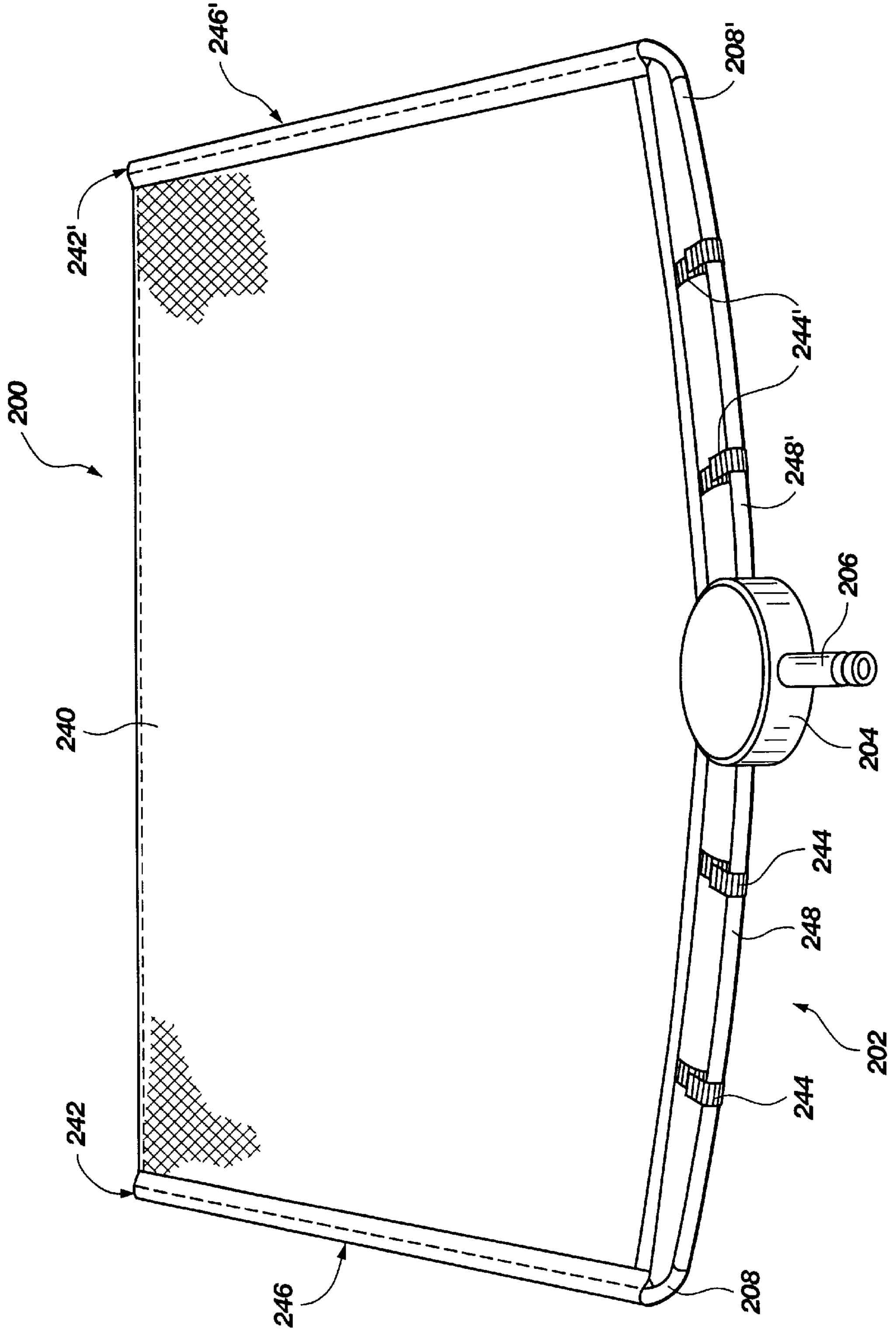
FIG. 17 illustrates an oblique view of another embodiment of a flag frame of the present invention.

FIG. 17 illustrates an embodiment of a two-rod flag frame assembly 200 of the present invention. The flag frame assembly 200 includes a two-rod frame 202 comprising central hub 204 with an attachment rod 206 extending therefrom, and two L-shaped rods 208, 208' of substantially equal length and shape extending from the central hub 204. The L-shaped rods 208, 208' are preferably oriented in substantially the same plane. The L-shaped rods 208, 208' are preferably made from deformable, resilient material such metal, plastic, or fiberglass. Most preferably, the L-shaped rods 208, 208' are made from hollow aluminum tubes.

Figure 18:
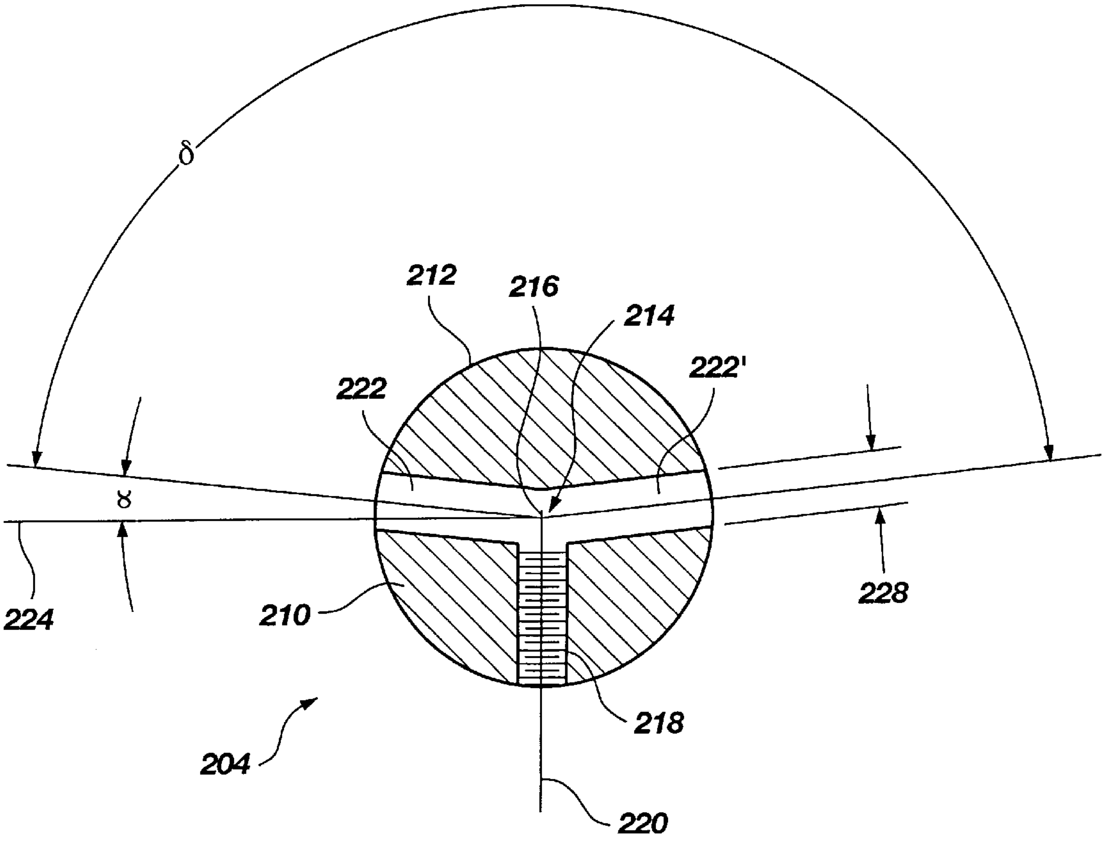
FIG. 18 illustrates a cross-sectional view of an embodiment of a central hub of the flag frame of FIG. 17 of the present invention.

The central hub 204 is illustrated in FIG. 18. The central hub 204 is illustrated as a circular housing 210 including three bores each extending from an outer circumference 212 to a convergence area 214 proximate the center 216 of the circular housing 210.

The three bores include a threaded bore 218, shown as aligned on a vertical axis 220. The treaded bore 218 receives a threaded portion (not shown) of the attachment rod 206 (shown in FIG. 17). It is, of course, understood, as discussed above for the central hub 102 of FIG. 2, that the threaded bore 218 could be any configuration to receive and hold the attachment rod 206, or that the treaded bore 218 could be eliminated by integrally forming the attachment rod 206 with the central hub 204 or permanently attaching the attachment rod to the central hub 204, such as by welding or an adhesive. The attachment rod 206 is used to attach the two-rod flag frame assembly 200 to a tripod or other flag frame support structure (not shown).

The two remaining bores are rod receiving bores 222, 222' for inserting the L-shaped rods 208, 208', respectively. The rod receiving bores 222, 222' are preferably angled slightly above a horizontal axis 224 of the central hub 202, shown as angle γ. In the illustrated embodiment, the angle γ is about 6 degrees above the horizontal axis 224. This results in an angle δ of about 168 degrees between rod receiving bore 222 and rod receiving bore 222'.

In a preferred embodiment, the central hub is about 1.75 inches in diameter. The rod receiving bores 222, 222' are preferably cylindrical and are preferably about 0.290 inches to about 0.325 inches in diameter 228 (depending on the diameter of the L-shaped rods 208, 208'). It is, of course, understood that the central hub and the rod receiving bores can be of any shape or configuration depending on the size and shape of the flag to be attached to the frame.

Referring to FIG. 17, a flag 240 is detachably attached to the two-rod frame 202. The flag 240 includes rod attachment means, such as sleeves 242, 242' and loops 244, 244'. Vertical portions 246, 246' (shown as dash lines) of the rods 208, 208' are inserted into the sleeves 242, 242', respectively. The loops 244, 244' encircle horizontal portions 248, 248' of the rods 208, 208', respectively. It is understood that loops 244, 244' may be a wide variety of structures and materials, such as VELCRO™ material, material with a snap attachment (as illustrated), tie strings, and the like. Furthermore, it is understood that the sleeves 242, 242' may also be loops, such as described for the loops 244, 244'. Preferably, the flag 240 is slightly shorter than a distance between the vertical portions 246, 246' such that when the flag 240 attached to the two-rod frame 202, the flag 240 is taut.

Figure 19:
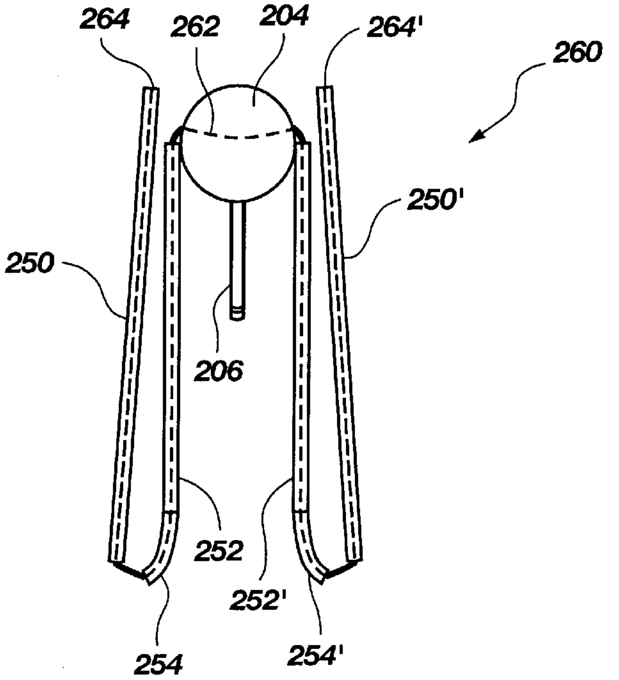
FIG. 19 illustrates an oblique view of an embodiment of a flag frame of FIG. 17 in a collapsed position.
Figure 20:
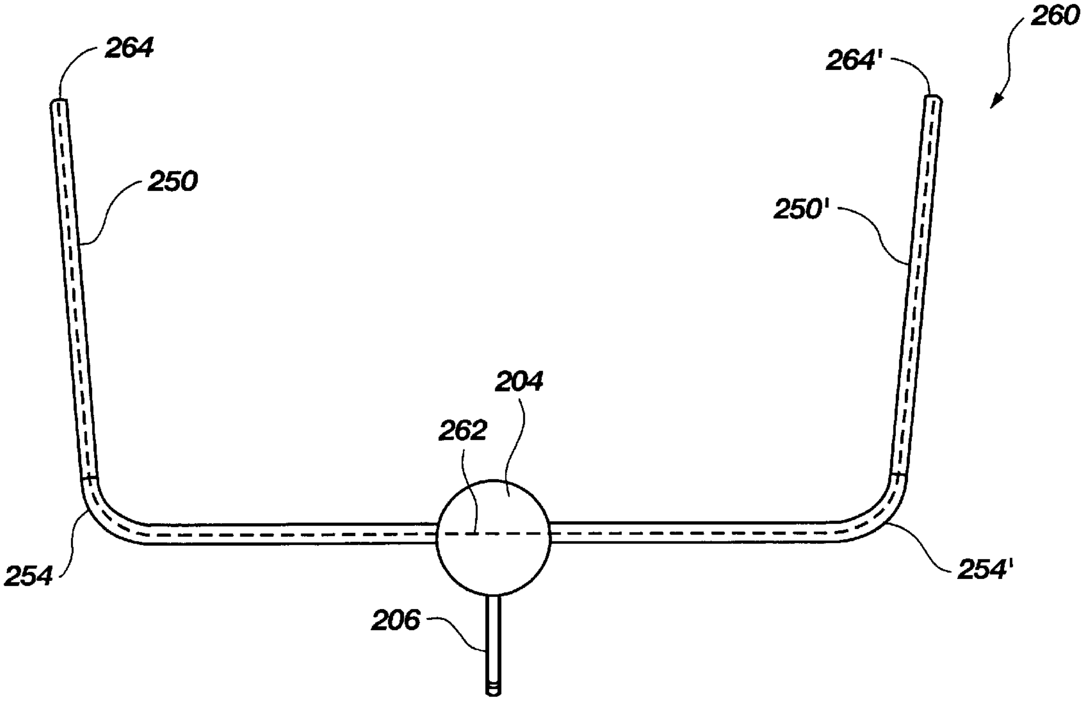
FIG. 20 illustrates an oblique view of an embodiment of a flag frame of FIG. 17 in an extended position.
Figure 21:
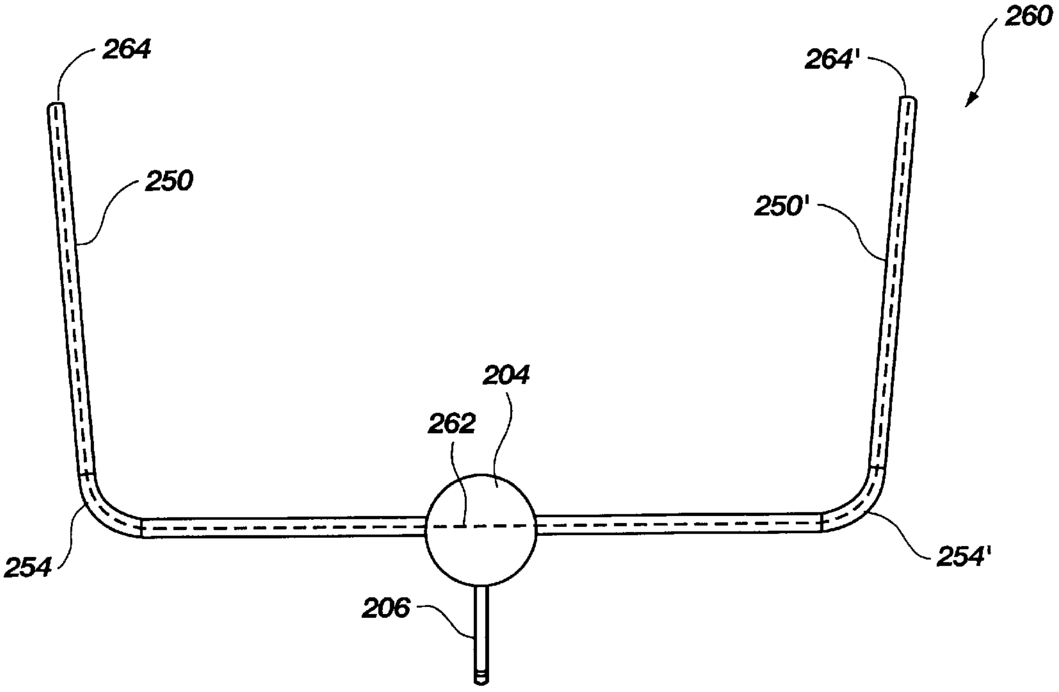
FIG. 21 illustrates an oblique view of another embodiment of a flag frame of FIG. 17 in an extended position.
Figure 22:
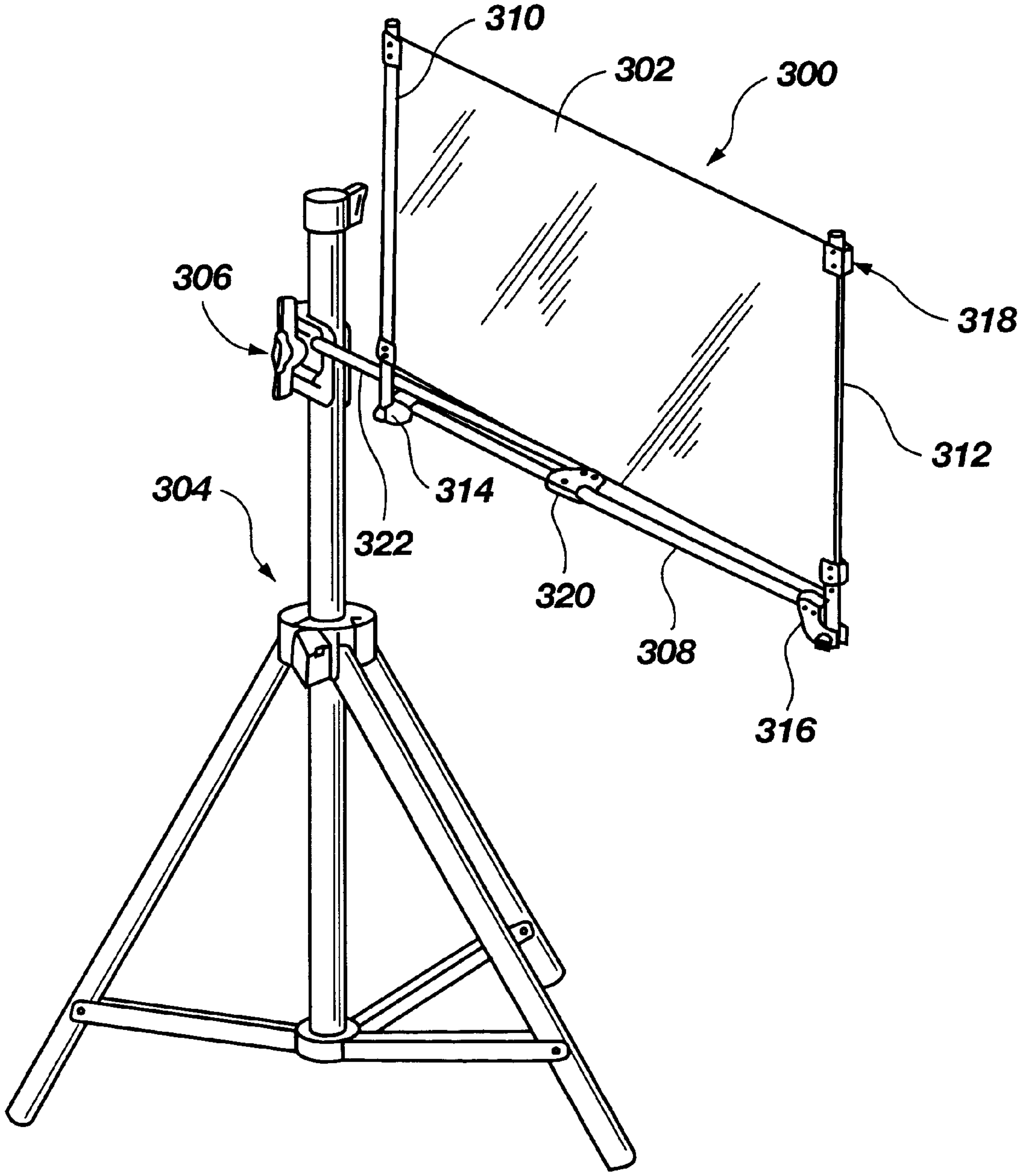
Fig. 22 (PRIOR ART)
FIG. 22 illustrates an oblique view of a prior art flag/frame/support configuration.

The L-shaped rods 208, 208' are preferably constructed of two separate rods, vertical rods 250, 250' and horizontal rods 252, 252', as shown in FIG. 20, wherein the vertical rods 250, 250' attach to the horizontal rods 252, 252', respectively. Separating each of the L-shaped rods 208, 208' into two separate rods conserves space when the two-rod frame 202 is collapsed. The vertical rods 250, 250' can be attached to the second upper rods 252, 252' by a variety of attachment means, such as illustrated in FIGS. 5 through 14. Either the vertical rods 250, 250' or the horizontal rods 252, 252' may have elbow portions 254, 254'. The elbow portions 254, 254' may be simply bends in either the vertical rods 250, 250' or the horizontal rods 252, 252' (illustrated as bends in horizontal rods 252, 252' in FIG. 20) or may be separate segments which are attached, such as by gluing or welding, to either the vertical rods 250, 250' or the horizontal rods 252, 252' (illustrated as attached to horizontal rods 252, 252' in FIG. 19). Alternately, elbow portions 254, 254' may be separate segments which detachably attach to both the vertical rods 250, 250' and the horizontal rods 252, 252', respectively, as shown in FIG. 21.

FIG. 19 illustrates a two-rod frame 260 of the present invention in a collapsed position and utilizing the elastic material engaging means described in FIG. 14. FIG. 20 illustrates the two-rod frame 260 of FIG. 18 in an extended position. FIGS. 19 and 20 illustrate how an elastic rod 262 (shown primarily as a dashed line) is utilized to serve the dual purpose of attaching the vertical rods 250, 250' to the horizontal rods 252, 252', respectively, and attach the horizontal rods 252, 252' to the central hub 204. The elastic rod 262 is attached proximate an end 264 of the vertical rod 250, and extends through the vertical rod 250, the horizontal rod 252, the central hub 204, the horizontal rod 252', and the vertical rod 250' where it is attached to an end 264' of the vertical rod 250'. Preferably, the elastic rod 262 is sufficiently taut when the two-rod frame 260 is in an extended position to maintain the frame's shape. Furthermore, as illustrated in FIG. 20, the vertical rods 250, 250' are preferably canted slightly outward off vertical to hold the flag 240 (shown in FIG. 17) taut.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A collapsible frame and light modifying flag assembly comprising:

a hub having a plurality of rod attachment members;

a plurality of rods detachably attached to said rod attachment members wherein said plurality of rods extend from said hub to define a first plane and wherein each of said plurality of rods terminates in a distal end opposing said hub;

a flexible light modifying flag, defining a second plane, directly detachably attached to said plurality of rods adjacent to said first plane, wherein at least one edge of said light modifying flag extends between a distal end of a first rod of said plurality of rods and a distal end of a second rod of said plurality of rods.

2. The assembly of claim 1, wherein said rod attachment members are rod bores in said hub.

3. The assembly of claim 1, wherein said rod attachment members are studs extending from said hub.

4. The assembly of claim 1, further including an attachment structure for attaching said plurality of rods to said plurality of rod attachment members.

5. The assembly of claim 4, wherein said attachment structure is selected from the group consisting of slip fits, spring retainers, threads, and elastic material.

6. The assembly of claim 5, wherein at least one of said rods comprises at least two rod portions and a rod attachment structure for attaching said rod portions.

7. The assembly of claim 6, wherein said rod attachment structure is selected from the group consisting of slip fits, spring retainers, threads, and elastic material.

8. The assembly of claim 4, wherein said hub has at least two rod attachment members and at least two rods attached to said hub with said at least two rod attachment members.

9. The assembly of claim 8, wherein said two rods comprises a first L-shaped rod and a second L-shaped rod.

10. The assembly of claim 9, wherein:

said first L-shaped rod and said second L-shaped rod are hollow;

said hub attachment means comprising slip fits;

said rod attachment members are rod bores in said hub wherein each of said rod bores extends from an outer periphery of said hub to a convergence area proximate a center of said hub; and further including an elastic element internally attached proximate a distal end said first L-shaped rod, extending internally through said first L-shaped rod, extending through said hub, and through said second L-shaped rod to attach to a distal end of said second L-shaped rod.

11. The assembly of claim 9, wherein said first L-shaped rod and said second L-shaped rod each comprise two separable portions, a horizontal rod portion and a vertical rod portion.

12. The assembly of claim 11, further including a rod attachment structure for attaching said horizontal rod portions to said vertical rod portions.

13. The assembly of claim 12, wherein said rod attachment structure is selected from the group comprising slip fits, spring retainers, threads, and elastic material.

14. The assembly of claim 11, wherein:

said first L-shaped rod and said second L-shaped rod are hollow;

said hub attachment means comprising slip fits;

said rod attachment members are rod bores in said hub wherein each of said rod bores extends from an outer periphery of said hub to a convergence area proximate a center of said hub; and further including an elastic element internally attached proximate a distal end said first L-shaped rod vertical portion, extending internally through said first L-shaped rod vertical portion, extending internally through said first L-shaped rod horizontal portion, extending through said hub, through said second L-shaped rod horizontal portion, through said second L-shaped rod vertical portion to attach to a distal end of said second L-shaped rod vertical portion.

15. The assembly of claim 1, further including an attachment rod attached to and extending from said hub for attachment of said collapsible frame to an external support.

16. The assembly of claim 1, wherein said hub has at least four rod attachment members and at least four rods attached to said hub with said at least four rod attachment members.

17. The assembly of claim 16, wherein said at least four rods comprise a first lower rod, a second lower rod, a first upper rod, and a second upper rod.

18. The assembly of claim 17, wherein said first upper rod and said second upper rod each comprise two separable rod portions comprising a second upper rod portion attaching to a first upper rod portion, and said first upper rod portion attaching to said hub.

19. The assembly of claim 18, further including a rod attachment structure for attaching said rod portions.

20. The assembly of claim 19, wherein said rod attachment structure is selected from the group consisting of slip fits, spring retainers, threads, and elastic material.

21. The assembly of claim 17, wherein:

said first and second lower rods and said first and second upper rods are hollow;

said attachment structure comprising slip fits;

said rod attachment members are rod bores in said hub wherein each of said rod bores extends from an outer periphery of said hub to a convergence area proximate a center of said hub; and further including a first elastic element internally attached proximate a distal end the first upper rod, extending internally through the first upper rod, extending through said hub, and through said second lower rod to attach to a distal end of said second lower rod; and a second elastic element internally attached proximate a distal end the second upper rod, extending internally through said second upper rod, extending through said hub, and through said first lower rod to attach to a distal end of said first lower rod.

22. The assembly of claim 18, wherein:

said first and second lower rods, said first upper rod first and second portions, and said second upper rod first and second portions are hollow;

said attachment structure comprising slip fits;

said rod attachment structure comprising slip fits;

said rod attachment members are rod bores in said hub wherein each of said rod bores extends from an outer periphery of said hub to a convergence area proximate a center of said hub; and further including a first elastic element internally attached proximate a distal end the first upper rod second portion, extending internally through the first upper rod second portion, extending internally through the first upper rod first portion, extending through said hub, and through said second lower rod to attach to a distal end of said second lower rod; and a second elastic element internally attached proximate a distal end the second upper rod second portion, extending internally through said second upper rod second portion, extending internally through said second upper rod first portion, extending through said hub, and through said first lower rod to attach to a distal end of said first lower rod.

23. The assembly of claim 1, wherein said first plane and said second plane are substantially coextensive.

* * * * *